United States Patent [19]

Niedenbrueck et al.

[11] Patent Number: 5,334,734
[45] Date of Patent: Aug. 2, 1994

[54] VAT DYES

[75] Inventors: Matthias Niedenbrueck, Limburgerhof; Manfred Patsch, Wachenheim, both of Fed. Rep. of Germany

[73] Assignee: BASF Aktiengesellschaft, Ludwigshafen, Fed. Rep. of Germany

[21] Appl. No.: 966,404

[22] Filed: Oct. 26, 1992

[30] Foreign Application Priority Data

Nov. 14, 1991 [DE] Fed. Rep. of Germany .... P4137416

[51] Int. Cl.$^5$ ............................ C09B 3/40; C09B 3/44
[52] U.S. Cl. .................................. 552/278; 552/274; 552/282; 552/283; 552/281
[58] Field of Search ............... 552/274, 281, 282, 278, 552/283

[56] References Cited

U.S. PATENT DOCUMENTS 1,994,136 3/1935 Kunz et al. .
4,547,575 10/1985 Tzikas .

Primary Examiner—Johann Richter
Assistant Examiner—Kimberly J. Kestler
Attorney, Agent, or Firm—Oblon, Spivak, McClelland, Maier & Neustadt

[57] ABSTRACT

Vat dyes for dyeing and printing cellulose material have the formula

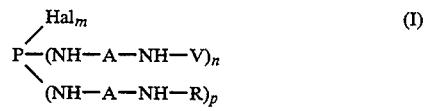

where P=pyranthrone structure, A=1,4-or 1,5-anthraquinonyl, V=a violanthronyl or isoviol-anthronyl radical which may carry up to 2 chlorine or bromine atoms as substitutents, R=hydrogen, the acyl radical of an aliphatic $C_1$–$C_6$-carboxylic acid or the acyl or sulfonyl radical of an aromatic carboxylic or sulfonic acid, Hal=chlorine or bromine, m=from 0 to 3, n=from 1 to 4, and p=from 0 to 3, with the proviso that the sum m+n+p is not greater than 4.

3 Claims, No Drawings

VAT DYES

The present invention relates to novel vat dyes of the general formula (I)

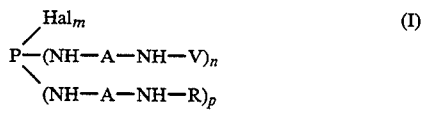

where
P is a pyranthrone structure,
A is 1,4- or 1,5-anthraquinonylene,
V is a violanthronyl or isoviolanthronyl radical which may carry up to 2 chlorine or bromine atoms as substituents,
R is hydrogen, the acyl radical of an aliphatic $C_1$-$C_6$-carboxylic acid or the acyl or sulfonyl radical of an aromatic carboxylic or sulfonic acid,
Hal is chlorine or bromine,
m is from 0 to 3,
n is from 1 to 4, and
p is from 0 to 3,
with the proviso that the sum m+n+p is not greater than 4.

The present invention further relates to the preparation of these vat dyes and to the use thereof for dyeing and printing cellulose material.

Dyes which are to be used for dyeing textile materials must possess not only high light and wash fastness but also a high color strength.

Cellulose-containing textile material is frequently dyed using vat dyes. They can be based inter alia on anthraquinone, benzanthrone or higher ring systems such as pyranthrone. US-A-1 994 136 and EP-A-88 048 disclose vat dyes obtained by condensation of halogenated violanthrones and aminoanthraquinones. D-RP-471 040 describes condensation products of halogenated pyranthrones and aminoanthra-quinones for use as vat dyes.

However, these dyes give dyeings that are unsatisfactory, either as regards the cleanness of their gray shades or as regards their fastness properties.

It is an object of the present invention to provide novel vat dyes with which cellulose fibers can be dyed in neutral gray shades with high color strength and good fastness properties.

We have found that this object is achieved by the vat dyes (I) defined at the beginning.

We have also found a process for preparing these vat dyes, which comprises condensing 1,4- or 1,5-diaminoanthraquinone (II), halogenated violanthrone or iso-violanthrone or mixtures thereof (III) and halogenated pyranthrone (IV) and optionally reacting the resulting condensation product with an acylating or sulfonylating agent.

We have also found a method of using the vat dyes (I) for dyeing and printing cellulose material.

In the vat dyes (I) of the invention, the pyranthrone structure can carry up to 4, preferably at least 2 substituents. Of these substituents, at least one must correspond to a diaminoanthraquinone condensed with violanthrone or isoviolanthrone.

Preference is given to those dyes (I) that contain diaminoanthraquinone only as-condensed with violanthrone or isoviolanthrone (p=0).

If p≠0, the remaining amino group of the diaminoanthraquinone is preferably blocked by reaction with an acylating or sulfonylating agent (is. R ≠hydrogen). This reaction is suitably carried out with the acid derivatives customarily used, in particular the halides, preferably the bromides and especially the chlorides, and also the anhydrides of aliphatic $C_1$-$C_6$-carboxylic acids and of aromatic carboxylic acids, such as phenylacetic acid and in particular benzoic acid, and of aromatic sulfonic acids, such as benzenesulfonic acid and especially toluenesulfonic acid, in which case the carbon structures of these acids may carry additional substituents, such as methyl, ethyl, methoxy, halogen, hydroxyl or nitro.

Examples of suitable R are acetyl, chloroacetyl, propionyl, butyryl, benzoyl, o-, m- and p-chlorobenzoyl, m- and p-nitrobenzoyl, o- and p-hydroxybenzoyl, o-, m- and p-methylbenzoyl, o-, m- and p-methoxybenzoyl, phenylacetyl, benzenesulfonyl and o- and p-toluene-sulfonyl. Of these, preference is given to p-toluene-sulfonyl and especially acetyl and benzoyl.

The dyes (I) are obtainable by condensation of 1,4- or 1,5-dialainoanthraquinone (II)

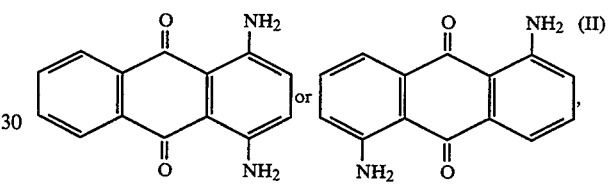

halogenated violanthrone or isoviolanthrone or mixtures thereof (III) having a preferred bromine content of from 14 to 36% by weight or having a chlorine content of from 7 to 19% by weight (corresponding to a halogen content of about 1-3 mol per mole of violanthrone or isoviolanthrone)

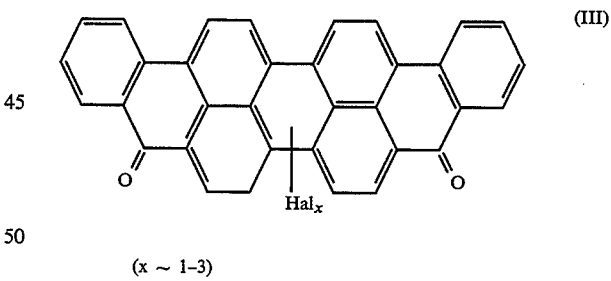

or

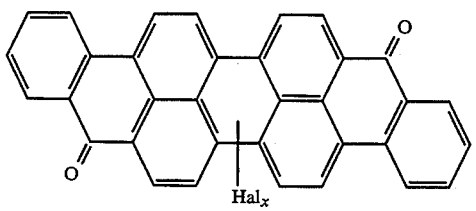

and halongenated pyranthrone (IV) having a preferred bromine content of from 16 to 45% by weight or a preferred chlorine content of from 8 to 26% by weight (corresponding to a halogen content of about 1-4 mol per mole of pyranthrone)

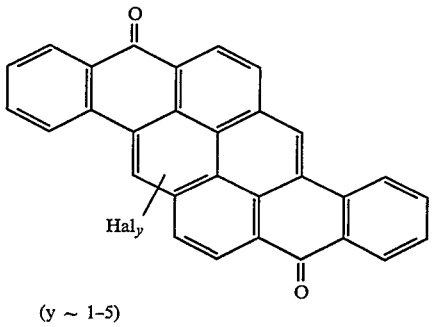

(IV)

(y ~ 1-5)

preferably in a molar ratio of from 4:4:1 to 1:1:1.

A preferred component (III) for the reaction is brominated violanthrone. It can be used in the form of its as-synthesized mixture with about 0.5–10% of isoviolanthrone and need not be expensively purified.

Particularly preferred dyes (I) are obtainable by condensation of diaminoanthraquinone (II), brominated violanthrone (III) having a bromine content of from 14 to 19% by weight and halogenated pyranthrone (IV) having a bromine content of from 35 to 45% by weight or a chlorine content of from 12 to 16% by weight in a molar ratio of from 2.5:2.5:1 to 1.5:1.5:1.

The molar ratio between components (II) and (III) may in fact differ from 1:1 as long as the overall molar ratio between the three components is within the above-specified limits.

This may apply in particular when the dyes (I) are prepared not in one stage by simultaneous condensation of all three components but in two stages by formation of a first condensation product from two components (a) (II) +(III) or b) (II) +(IV)) and subsequent further condensation with whichever component is left.

For instance, the particularly favorable reaction sequence a) comprises first condensing (II) and (III), preferably in a molar ratio of from 1.5:1 to 1:1, and then reacting the resulting primary product with, preferably, about 0.7–0.4 mol of (IV) per mole of precharged (II). If the form of violanthrone (III) used contains more than one halogen atom, then the molar ratio of (II) to (III) preferably differs only little from 1:1.

In the case of an excess of (II) over (III) it is advisable to block the primary amino groups still present by reacting the resulting dyes (I) with one of the abovementioned acylating or sulfonylating agents.

The starting compounds (II), (III) and (IV) and the preparation thereof are generally known, being described for example in the above-cited references US-A-1 994 136, EP-A-88 048 and D-RP-471 040. They can be used directly in the as-synthesized form and need not be further purified.

The reaction conditions of the process according to the invention correspond to those customary in the synthesis of vat dyes by condensation of vattable polycyclic compounds, described for example in EP-A-119 956.

For instance, the condensation is conveniently carried out at elevated temperature, in general at from 160° to 220° C., preferably in the presence of a high-boiling inert organic solvent, such as nitrobenzene or methyl benzoate, and also in the presence of a water-soluble, acid-binding alkali metal salt, such as sodium acetate, potassium acetate, sodium carbonate or potassium carbonate, and of a catalyst comprising copper powder and/or a copper compound, such as copper(I) chloride.

This copper catalyst may, as described in EP-A-119 956, also be added a little at a time during the reaction, which advantageously reduces the total amount required.

The condensation generally takes from 10 to 36 hours.

The workup of the reaction mixture for the dyes (I) can be carried out in a conventional manner, preferably by removing the solvent by steam distillation, separating off the dyes (I) by filtration, washing acid-and halide-free with hot water, and drying. The subsequent decoppering can be effected by heating in dilute hydrochloric acid.

If the products (I) still contain primary amino groups, they can advantageously be acylated or sulfonylated directly in the as-condensed reaction mixture without prior isolation, in which case the reaction temperature, in general from room temperature to about 150° C., must be adapted to the particular acylating or sulfonylating agent.

The vat dyes (I) of the invention are advantageous for dyeing and printing cellulose material, in particular cotton. They produce dyeings in gray to black shades that are particularly notable for a neutral hue, a high color strength and good fastness properties.

EXAMPLES

Preparation and use of vat dyes (I)

EXAMPLE 1

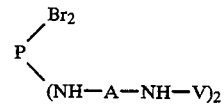

A mixture of 76 g of brominated violanthrone (15% by weight of bromine) and 37 g of 1,4-diaminoanthraquinone in 1 l of nitrobenzene was heated to 200° C. following addition of 15 g of sodium carbonate and 3 g of copper powder. After 15 h, 61 g of brominated pyranthrone (39% by weight of bromine), 17 g of sodium carbonate and 3 g of copper powder were added. The reaction mixture was then maintained at 200° C. for a further 15 h.

A steam distillation was then carried out to remove the nitrobenzene from the reaction mixture. The dye was separated off by filtration, washed with hot water, decoppered by heating in dilute hydrochloric acid and dried.

150 g of dye having a bromine content of 10.5% by weight were obtained.

This dye was then used for dyeing a cotton sample.

0.2 g (for a gray dyeing) or 1 g (for a black dyeing) of the dye was vatted at 25° C. over 10 min in 200 ml of an aqueous solution containing 6.6 ml of 38° Bésodium hydroxide solution and 1.5 g of sodium di This vat was entered with 10 g of cotton. Then the temperature was raised over 30 min to 60° C. and thereafter over 15 min to 80° C. Dyeing was then continued at that temperature for an additional 30 min.

The dyeing was squeezed off, air oxidized and finished in a conventional manner.

The cotton sample had a neutral gray or black color, in either case with very good fastness properties.

EXAMPLE 2

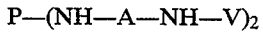

A mixture of 21 g of chlorinated pyranthrone (15% by weight of chlorine) and 22 g of 1,4-diamninoanthraquinone in 1 l of nitrobenzene was heated to 200° C. following addition of 25 g of potassium carbonate and 5 g of copper powder. After 20 h, 48 g brominated violanthrone (15% by weight of bromine) and a further 5 g of copper powder were added. The reaction mixture was then maintained at 200° C. for a further 16 h.

Dye isolation and sample dyeing were carried out as described in Example 1.

The amount of dye obtained was 62 g, and it dyed cotton in gray to black shades.

EXAMPLE 3

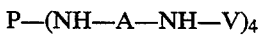

A mixture of 41 g of brominated pyranthrone (39% by weight of bromine) and 49 g of 1,4-diaminoanthraquinone in 1 l of nitrobenzene was heated to 200° C. following addition of 32 g of sodium carbonate and 6 g of copper powder. After 8 h, 500 ml of nitrobenzene were added, followed by 101 g of brominated violanthrone (15% by weight of bromine), 15 g of sodium carbonate and 6 g of copper powder. The reaction mixture was then maintained at 200° C. for a further 15 h.

Dye isolation and sample dyeing were carried out as described in Example 1.

The dye was obtained in an amount of 160 g, and had a bromine content of 1.5% by weight, and it dyed cotton in gray to black shades.

EXAMPLE 4

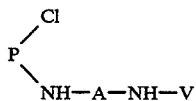

A mixture of 71 g of chlorinated pyranthrone (15% by weight of chlorine) and 81 g of 1,4-diaminoanthraquinone in 850 ml of nitrobenzene was heated to 200° C. following addition of 43 g of sodium carbonate and 4 g of copper powder. After 20 h, 850 ml of nitrobenzene were added, followed by 111 g of brominated violanthrone (15% by weight of bromine), 15 g of sodiuxn carbonate and 3 g of copper powder. The reaction mixture was then maintained at 200° C. for a further 15 h.

Dye isolation and sample dyeing were carried out as described in Example 1.

The dye was obtained in an amount of 235 g with a halogen content of 4.0% by weight of chlorine and 1.4% by weight of bromine, and it dyed cotton in gray to black shades.

We claim:

1. Vat dyes of the general formula (I)

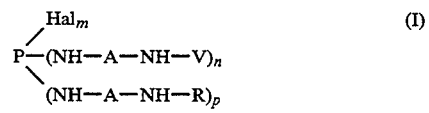

where
P is pyranthrone,
A is 1,4- or 1,5-anthraquinonylene,
V is a violanthronyl or isoviolanthronyl radical which may carry up to 2 chlorine or bromine atoms as substituents,
R is hydrogen, the acyl radical of an aliphatic $C_1$-$C_6$-carboxylic acid or the acyl or sulfonyl radical of an aromatic carboxylic or sulfonic acid,
Hal is chlorine or bromine,
m is from 0 to 3,
n is from 1 to 4, and
p is from 0 to 3,
with the proviso that the sum m+n+p is not greater than 4.

2. Vat dyes of the general formula (I) as claimed in claim 1, obtainable by condensation of 1,4- or 1,5-diaminoanthraquinone (II), halogenated violanthrone or isoviolanthrone or mixtures thereof (III) and halogenated pyranthrone (IV) and optionally further reaction of the resulting Condensation product with an acylating or sulfonylating agent.

3. Vat dyes of the general formula (I) as claimed in claim 1, obtainable by condensation of 1,4- or 1,5-diaminoanthraquinone (II), halogenated violanthrone or iso-violanthrone or mixtures thereof (III) having a bromine content of from 14 to 36% by weight or a chlorine content of from 7 to 19% by weight and halogenated pyranthrone (IV) having a bromine content of from 16 to 45% by weight or a chlorine content of from 8 to 26% by weight in a molar ratio of from 4:4:1 to 1:1:1 and optionally further reaction of the resulting condensation product with an acylating or sulfonylating agent.

* * * * *